US012792718B2

(12) United States Patent
Mahan et al.

(10) Patent No.: US 12,792,718 B2
(45) Date of Patent: Nov. 10, 2026

(54) SYSTEMS AND METHODS FOR ASSOCIATING AN OPERATING SYSTEM USER ACCOUNT WITH A SINGLE SIGN-ON IDENTIFIER

(71) Applicant: Cisco Technology, Inc., San Jose, CA (US)

(72) Inventors: Kara D. Mahan, Ann Arbor, MI (US); Zachary O. Weglarz, Ann Arbor, MI (US); Sebastian Jack Green-Husted, Lansing, MI (US); Ethan A. Dunnum, South Lyon, MI (US); Riley Rose Van Alsburg, Austin, TX (US); Joseph Cleary Duggan, Traverse City, MI (US); Ben A. Murray, Ann Arbor, MI (US); Weston Andros Adamson, Ann Arbor, MI (US); James Paul Pringle, Ypsilanti, MI (US); Vignesh Manivasagam, Livonia, MI (US)

(73) Assignee: Cisco Technology, Inc., San Jose, CA (US)

( * ) Notice: Subject to any disclaimer, the term of this patent is extended or adjusted under 35 U.S.C. 154(b) by 15 days.

(21) Appl. No.: 19/177,854

(22) Filed: Apr. 14, 2025

(65) Prior Publication Data

US 2026/0320170 A1 Oct. 15, 2026

(51) Int. Cl.
*H04L 29/06* (2006.01)
*G06F 21/41* (2013.01)
*H04L 9/30* (2006.01)

(52) U.S. Cl.
CPC ................ *G06F 21/41* (2013.01); *H04L 9/30* (2013.01)

(58) Field of Classification Search
CPC ....................................................... G06F 21/41
See application file for complete search history.

(56) References Cited

U.S. PATENT DOCUMENTS 8,544,072 B1 9/2013 Masone et al.
12,526,268 B2 * 1/2026 Kumar ...................... H04L 9/14
(Continued)

OTHER PUBLICATIONS

"Integrated Windows Authentication", Microsoft, Jan. 27, 2024, Retrieved from https://learn.microsoft.com/en-us/entra/msal/java/advanced/integrated-windows-authentication on Apr. 11, 2025, pp. 1-2.

(Continued)

*Primary Examiner* — Jason K Gee
(74) *Attorney, Agent, or Firm* — Baker Botts L.L.P.

(57) ABSTRACT

In one embodiment, a method includes receiving a first notification indicating that a user has logged into a client computing device associated with the user, the first notification comprising a unique user identifier, a unique device identifier, and a client username, validating the first notification using a public key associated with the client computing device, determining whether a pairing record between a tuple of the client username and the unique device identifier and a single sign-on (SSO) identifier associated with the user exists in a database associated with the computing system, creating a temporary pairing record corresponding to a combination of the unique user identifier, the unique device identifier, and the client username into the database, receiving a request to log in to an SSO-protected resource determining whether the temporary pairing record exists in the database, and creating, in response to the determination that the temporary pairing record exists, the pairing record between the tuple of the client username and the unique device identifier and the SSO identifier.

20 Claims, 7 Drawing Sheets

(56) References Cited

U.S. PATENT DOCUMENTS

| | | | |
|---|---|---|---|
| 2005/0144463 A1* | 6/2005 | Rossebo ............. | H04L 63/0815<br>713/185 |
| 2016/0182289 A1 | 6/2016 | Kamrowski et al. | |
| 2020/0244638 A1* | 7/2020 | Gupta ........................ | G06F 9/50 |
| 2021/0266309 A1 | 8/2021 | Guccione et al. | |
| 2022/0116217 A1 | 4/2022 | Twede et al. | |
| 2023/0319025 A1 | 10/2023 | Srivastava et al. | |

OTHER PUBLICATIONS

"Okta FastPass", Okta, Retrieved from https://help.okta.com/oie/en-us/content/topics/identity-engine/devices/fp/fp-main.htm on Apr. 11, 2025, pp. 1-3.

* cited by examiner

SYSTEMS AND METHODS FOR ASSOCIATING AN OPERATING SYSTEM USER ACCOUNT WITH A SINGLE SIGN-ON IDENTIFIER

TECHNICAL FIELD

The present disclosure relates generally to identity and access management, and more particularly, to associating an operating system user account with a single sign-on identifier.

BACKGROUND

In a typical work environment, users must authenticate themselves multiple times throughout the day to access various digital resources. Upon starting their work computer, a user enters primary credentials—such as a username and password—to log into their operating system user account. However, during the course of a standard workday, the same user may be required to repeatedly re-enter credentials to access multiple web applications, an email client, a virtual private network (VPN), and other secured systems. Even when those applications are single sign-on (SSO) enabled, the user may be required to re-enter credentials multiple times when the applications are accessed through different browsers including embedded browsers included in particular applications. This repetitive authentication process occurs despite the fact that the user has already verified their identity on the same physical machine they routinely use. The need for repeated credential entry introduces inefficiencies, increases the risk of credential fatigue, and may lead to insecure practices such as password reuse or storage in unsecure locations.

DESCRIPTION OF EXAMPLE EMBODIMENTS

Overview

Figure 1:
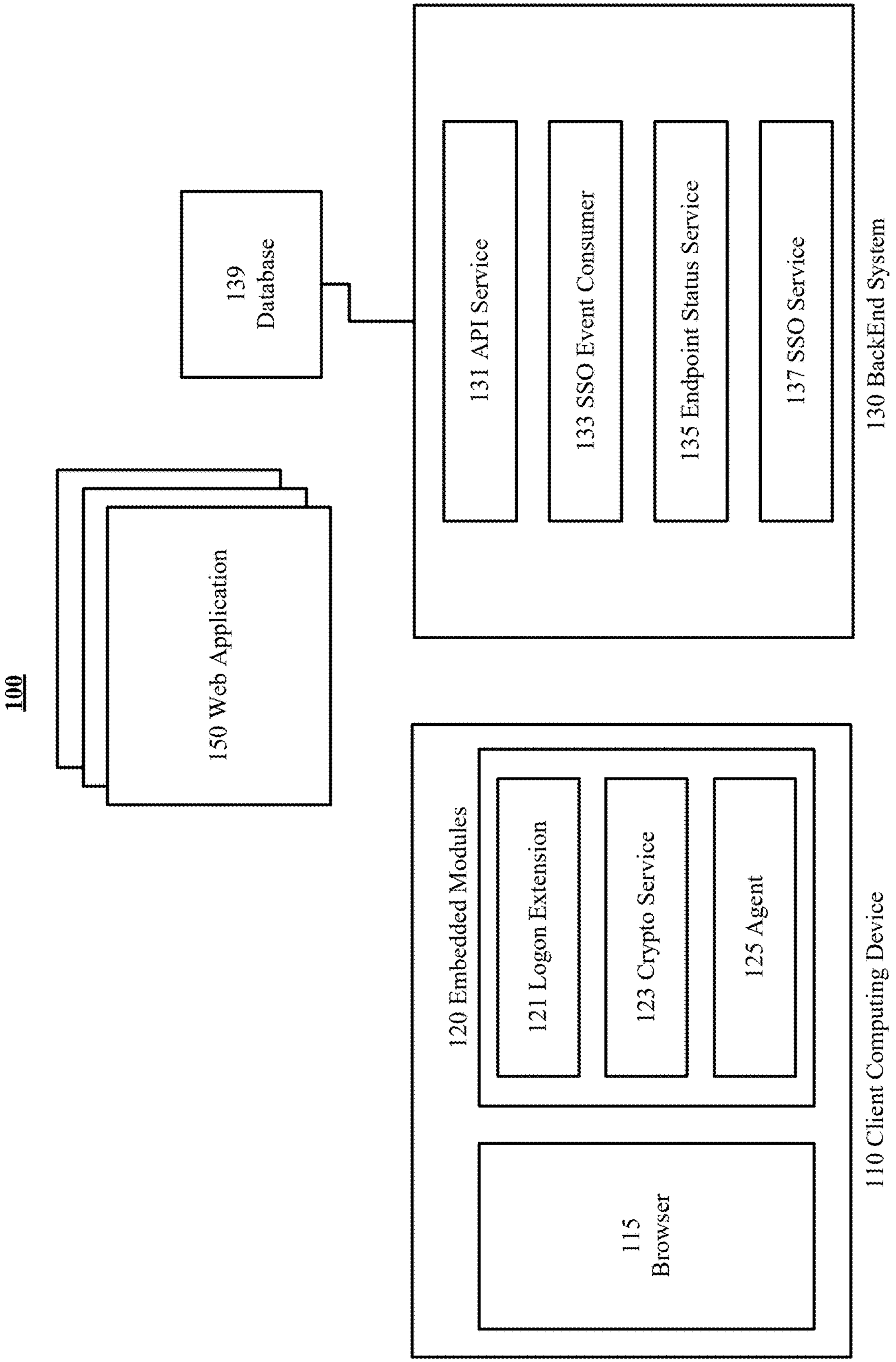
FIG. 1 illustrates an example logical architecture of a system for providing an SSO authentication in association with a validated client username logged on to a validated trusted client computing device.

In one or more embodiments, a method, by a computing system, may include receiving a first notification indicating that a user has logged into a client computing device associated with the user, the first notification comprising a unique user identifier, a unique device identifier, and a client username, where a part of the first notification is signed by a private key associated with the client computing device. The method may include validating the first notification using a public key associated with the client computing device. The method may include determining whether a pairing record between a tuple of a client username and a unique device identifier and an SSO identifier associated with the user exists in a database associated with the computing system. The method may include creating a temporary pairing record corresponding to a combination of the unique user identifier, the unique device identifier, and the client username into the database in response to the determination that the pairing record does not exist. The method may include receiving a request to log in to an SSO-protected resource, the request comprising the SSO identifier. The method may include determining whether the temporary pairing record exists in the database. The method may further include creating the pairing record between a tuple of a client username and a unique device identifier and the SSO identifier in response to the determination that the temporary pairing record exists.

In particular embodiments, a computing system may include one or more processors, and one or more computer-readable non-transitory storage media coupled to one or more of the processors. The one or more computer-readable non-transitory storage media may include instructions operable when executed by one or more of the processors to receive a first notification indicating that a user has logged into a client computing device associated with the user, the first notification comprising a unique user identifier, a unique device identifier, and a client username, wherein a part of the first notification is signed by a private key associated with the client computing device. The processors are further operable when executing the instructions to validate the first notification using a public key associated with the client computing device. The processors are further operable when executing the instructions to determine whether a pairing record between a tuple of a client username and a unique device identifier and an SSO identifier associated with the user exists in a database associated with the computing system. The processors are further operable when executing the instructions to create a temporary pairing record corresponding to a combination of the unique user identifier, the unique device identifier, and the client username into the database in response to the determination that the pairing record does not exist. The processors are further operable when executing the instructions to receive a request to log in to an SSO-protected resource, the request comprising the SSO identifier. The processors are further operable when executing the instructions to determine whether the temporary pairing record exists in the database. The processors are further operable when executing the instructions to create the pairing record between a tuple of a client username and a unique device identifier and the SSO identifier in response to the determination that the temporary pairing record exists.

In one or more embodiments, one or more computer-readable non-transitory storage media may embody software that is operable, when executed by a computing system, to receive a first notification indicating that a user has logged into a client computing device associated with the user, the first notification comprising a unique user identifier, a unique device identifier, and a client username, wherein a part of the first notification is signed by a private key associated with the client computing device. The software may be further operable when executed by the computing system to validate the first notification using a public key associated with the client computing device. The software may be further operable when executed by the computing system to determine whether a pairing record between a tuple of a client username and a unique device identifier and an SSO identifier associated with the user exists in a database associated with the computing system. The software may be further operable when executed by the computing system to create a temporary pairing record corresponding to a combination of the unique user identifier, the unique device identifier, and the client username into the database in response to the determination that the pairing record does not exist. The software may be further operable when executed by the computing system to receive a request to log in to an SSO-protected resource, the request comprising the SSO identifier. The software may be further operable when executed by the computing system to determine whether the temporary pairing record exists in the database. The software may be further operable when executed by the computing system to create the pairing record between a tuple of a client username and a unique device identifier and the SSO identifier in response to the determination that the temporary pairing record exists.

In particular embodiments, a computing system may associate an operating system (OS) user account with a single sign-on (SSO) identifier such that a user who logs on to a trusted client computing device with the OS user account may access SSO-protected resources without providing further credentials. In particular embodiments, the computing system may receive a first notification indicating that a user has logged into a client computing device associated with the user. The first notification may include a unique user identifier, a unique device identifier, and a client username. The unique user identifier may correspond to the user in the computing system. The unique device identifier may correspond to the client computing device. The client username may correspond to the user within an OS of the client computing device. The client computing device may create a pair of hardware-backed keys including a non-exportable private key and a public key. At least a part of the first notification may be signed by the private key associated with the client computing device. In particular embodiments, the public key associated with the client computing device may be pre-registered with the computing system. The computing system may validate the first notification using the public key associated with the client computing device. The computing system may determine whether a pairing record between a tuple of the client username and the unique device identifier and an SSO identifier associated with the user exists in a database associated with the computing system. In response to the determination that the pairing record does not exist, the computing system may create a temporary pairing record corresponding to a combination of the unique user identifier, the unique device identifier, and the client username into the database. In particular embodiments, the temporary pairing record may expire at a pre-determined duration of time.

In particular embodiments, the computing system may receive a request to log in to an SSO-protected resource. The request may include the SSO identifier. The computing system may receive a first signed status notification from the client computing device. The first signed status notification may include the unique user identifier, the unique device identifier, and the client username. The computing system may validate the first signed status notification using the public key. Upon a successful validation of the first signed status notification, the computing system may determine whether the temporary pairing record corresponding to the combination of the unique user identifier, the unique device identifier, and the client username exists in the database. In response to the determination that the temporary pairing record exists, the computing system may create the pairing record between a tuple of a client username and a unique device identifier and the SSO identifier after the user successfully completes an SSO authentication. In particular embodiments, the pairing record may include the unique device identifier such that the client username is paired with the SSO identifier only when the client username is used on the client computing device, which can be validated by a signed status notification from the client computing device.

In particular embodiments, the computing system may receive a second notification indicating that the user has logged into the client computing device. The second notification may include the unique user identifier, the unique device identifier, and the client username. At least a part of the second notification may be signed by the private key associated with the client computing device. The computing system may validate the second notification using the public key associated with the client computing device. The computing system may determine that the pairing record between a tuple of the client username and the unique device identifier and the SSO identifier exists in the database. In response to the determination that the pairing record between a tuple of the client username and the unique device identifier and the SSO identifier exists in the database, the computing system may create an SSO remember me session for the SSO identifier accessed by the user corresponding to the client username on the client computing device. The SSO remember me session may expire when a session expiration condition is satisfied. In particular embodiments, the session expiration condition may include a timeout at a pre-determined amount of time. In particular embodiments, the session expiration condition may include an event where the user logs off the client computing device.

In particular embodiments, the computing system may receive an SSO authentication request for an SSO-enabled application. The SSO authentication request may include the SSO identifier. In particular embodiments, the SSO-enabled application may be a web application. In particular embodiments, the SSO-enabled application may be an application running on a thick client. Upon receiving the SSO authentication request, the computing system may send a notification to the client computing device indicating that the second signed status notification is needed. The computing system may receive a second signed status notification from the client computing device. The computing system may validate the second signed status notification using the public key associated with the client computing device. The second signed status notification may include the unique user identifier, the unique device identifier, and the client username. In particular embodiments, the second signed status notification may also include the SSO identifier. Upon a successful validation of the second signed status notification, the computing system may determine that the SSO remember me session for the SSO identifier is active. The computing system may send a signed digital proof of an authentication to the client computing device. The signed digital proof may allow the user to access digital resources from the SSO-enabled application. In particular embodiments, the signed digital proof of the authentication may be a signed browser cookie. In particular embodiments, the signed digital proof of the authentication may be a signed access token.

Technical advantages of certain embodiments of this disclosure may include one or more of the following. This disclosure describes systems and methods for validating the client username logged on to the client computing device identified by the unique identifier using the digital signature techniques with a pair of hardware-backed keys including a non-exportable private key and a public key. This disclosure also describes systems and methods for maintaining an SSO remember me session for an SSO identifier while a corresponding user is logged on to a trusted client device with a client username. Upon successfully validating that the user is logged on to the client device with the client username, the SSO identifier is authenticated without providing further credentials while the SSO remember me session for the SSO identifier is active. Thus, this disclosure eliminates unnecessary repetitive SSO authentication processes. This disclosure further describes techniques for providing the SSO authentication in association with a validated client username logged on a validated trusted client device with little configuration on the part of the user or administrator. The techniques described in this disclosure are not tied to a particular operating system logon provider: the client computing device does not need to be domain joined, nor does operating system identity need to be provided by the Identity Provider (IdP) connected to the SSO.

Other technical advantages will be readily apparent to one skilled in the art from the following figures, descriptions, and claims. Moreover, while specific advantages have been enumerated above, various embodiments may include all, some, or none of the enumerated advantages.

Example Embodiments

This disclosure describes systems and methods for associating an operating system user account with a single sign-on identifier. FIG. 1 illustrates an example logical architecture of a system 100 for providing an SSO authentication in association with a validated client username logged on to a validated trusted client computing device. A client computing device 110 may include at least one browser 115 and embedded modules 120. The embedded modules 120 may be deployed to provide the SSO service in association with the validated client username logged on to the client computing device 110. The embedded modules 120 may include an OS logon service extension 121, which may be an extension of the logon component of the operating system on the client computing device 110. The OS logon service extension 121 may perform custom functions required to provide the SSO authentication in association with the validated client username on the client computing device 110. The embedded modules 120 may also include an agent 125, which may perform a status check with a backend system 130. The embedded modules 120 may further include a crypto service 123, which is a system-level daemon on the client computing device 110, with access to the hardware security module. The crypto service 123 may sign data elements or messages using the private key associated with the client computing device 110 upon receiving requests from the OS logon service extension 121 or the agent 125. The browser 115 of the client computing device 110 may communicate with the one or more SSO-enabled web applications 150. Although this disclosure describes a particular architecture of a client computing device, this disclosure contemplates any suitable architecture of a client computing device. The functionalities of a client computing device 110 described in this disclosure may be performed by any suitable component of the client computing device 110. The backend system 130 may communicate with the client computing device 110 and the one or more SSO-enabled web applications 150 to provide SSO authentications in associated with the validated client username logged on to the validated trusted client computing device. The backend system 130 may include an application programming interface (API) service 131, an SSO event consumer service 133, an endpoint status service 135, and an SSO service 137. The backend system 130 may be associated with a database 139. In particular embodiments, the database 139 may be deployed within the backend system 130. In particular embodiments, the database 139 may be deployed on a remote system from the backend system 130. The API service 131 may receive and process API requests from remote systems. The SSO event consumer service 133 may process internal events received from other services within the backend system 130. The endpoint status service 135 may receive device status notification from the agents 125 deployed on the client computing devices 110. The SSO service 137 may implement SSO for web applications as well as client applications deployed on thick client devices. In particular embodiments, the backend system 130 may behave as an Identity Provider (IdP) for the third-party applications including the web applications and the applications deployed on thick client devices. Although this disclosure describes a particular architecture of a backend system, this disclosure contemplates any suitable architecture of a backend system. The functionalities of a backend system 130 described in this disclosure may be performed by any suitable component of the backend system 130.

Figure 2:
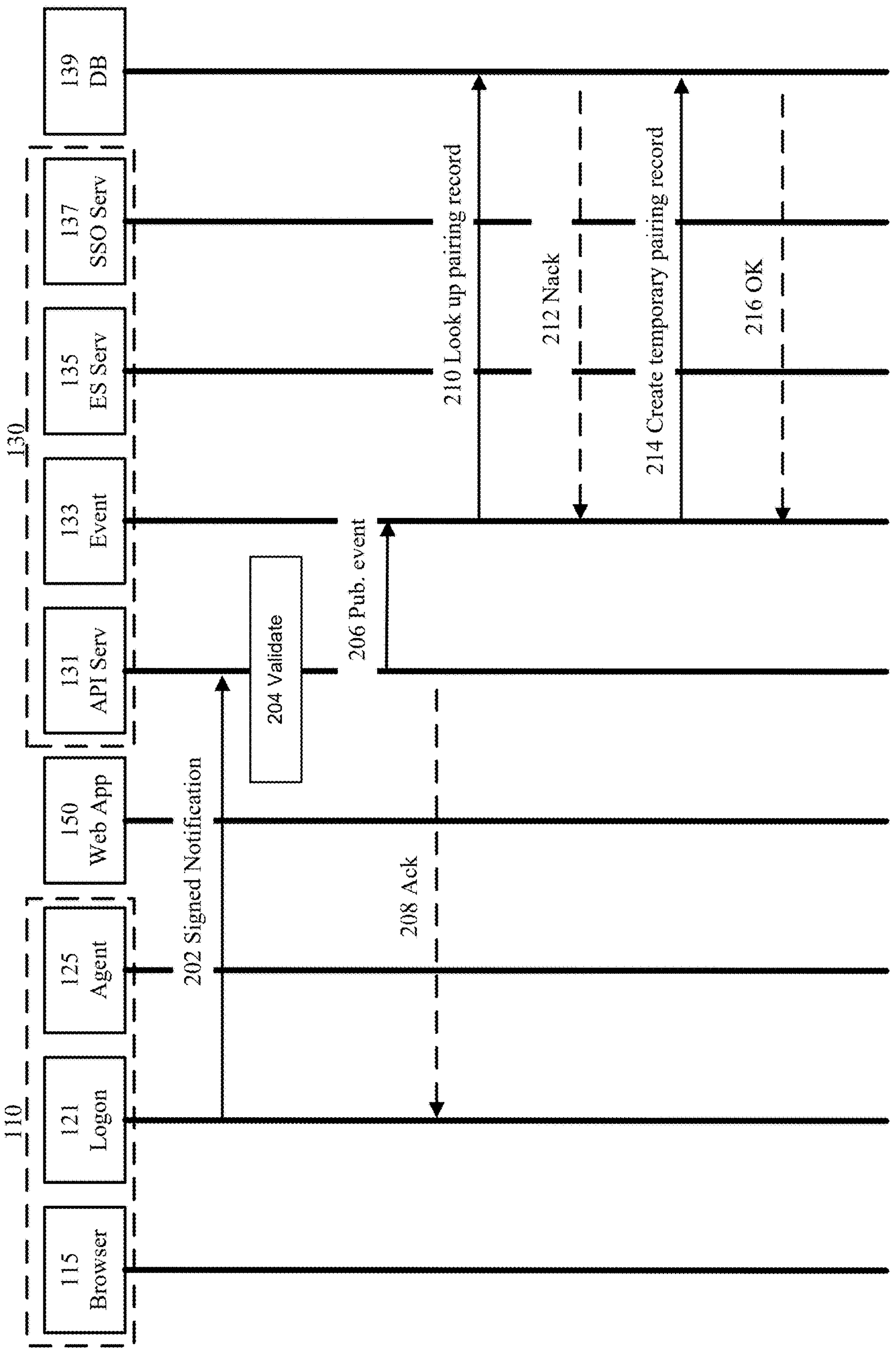
FIG. 2 illustrates an example message flow for creating a pairing record between a tuple of a client username and a unique device identifier and an SSO identifier, where the client username is unique within an OS of a client device identified by the unique device identifier.
Figure 2:
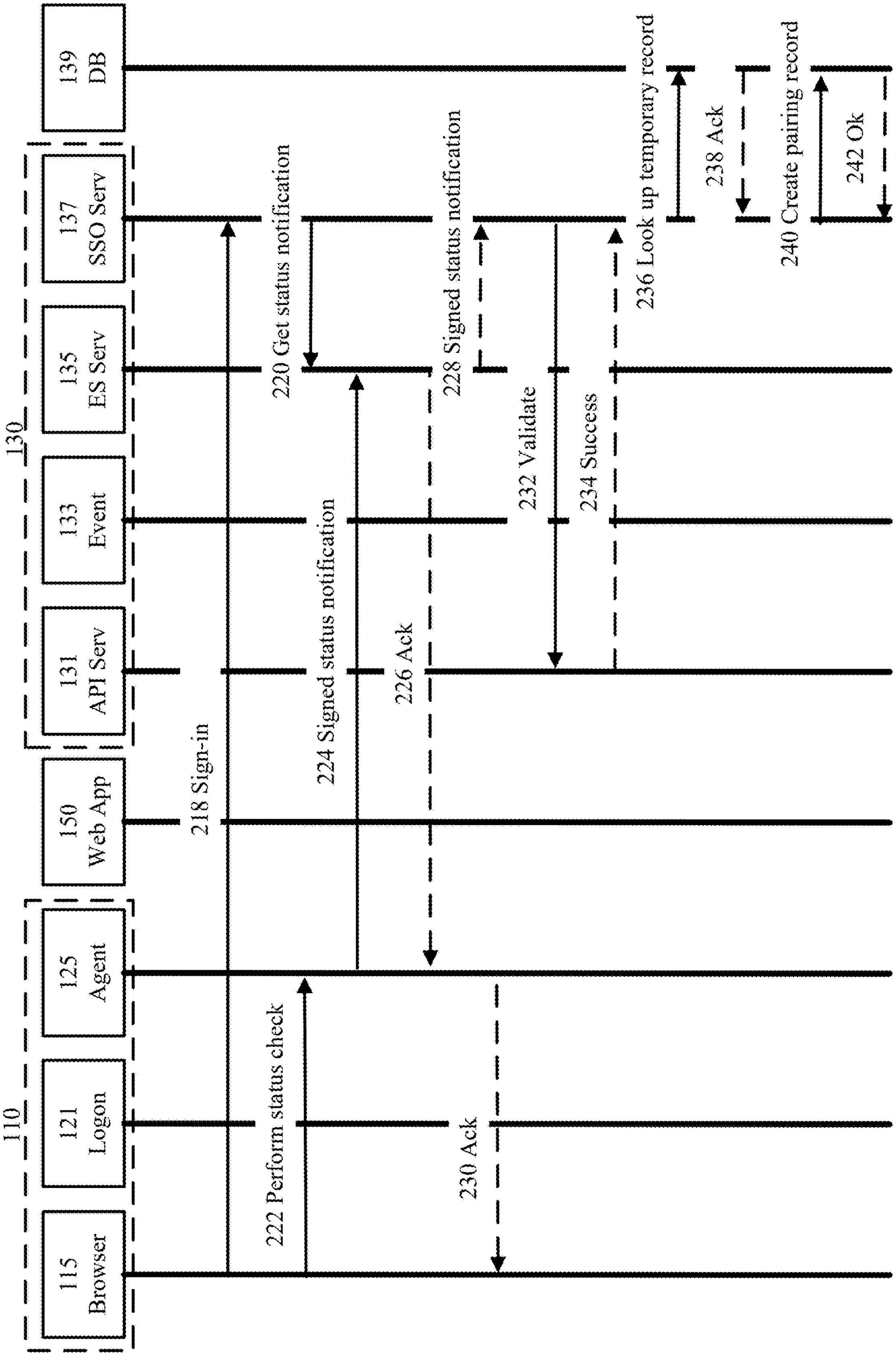

In particular embodiments, a computing system may associate an operating system (OS) user account on a trusted client computing device with a single sign-on (SSO) identifier such that a user who logs on to the trusted client computing device with the OS user account may access SSO-protected resources without providing further credentials. FIG. 2 illustrates an example message flow for creating a pairing record between a tuple of a client username and a unique device identifier and an SSO identifier, where the client username is unique within an OS of a client device identified by the unique device identifier. The message flow illustrated in FIG. 2 may be simplified for brevity. The client username may be any unique identifier associated with the OS user account identified by the OS of the trusted client computing device. For example, a user identifier uniquely identifying the user within the OS of the trusted client computing device may be referred to as the client username. For another example, a security identifier uniquely identifying a user within the OS of the trusted client computing device may be referred to as the client username.

In particular embodiments, the client computing device may create a pair of hardware-backed keys including a non-exportable private key and a public key. A unique device identifier corresponding to the client computing device and the public key associated with the client computing device may be registered with a computing system corresponding to the backend system 130. In particular embodiments, the unique device identifier may be assigned by the backend system 130 to the client computing device. The unique device identifier is globally unique within the backend system 130. Although this disclosure describes registering a public key associated with a client computing device in a particular manner, this disclosure contemplates registering a public key associated with a client computing device in any suitable manner.

In particular embodiments, a user associated with a client computing device 110 may log on to the client computing device 110 using a client username. The client username used for logging on to the client computing device 110 may be an OS user account identifier associated with the user. Upon detecting the logon event, the client computing device 110 may send a first notification to a computing system corresponding to a backend system 130. As an example and not by way of limitation, the OS logon service extension 121 embedded on the client computing device 110 may detect the user's logon event and prepare a notification. The notification may include a unique user identifier corresponding to the user within the backend system 130, a unique device identifier corresponding to the client computing device 110, and the client username. The OS logon service extension 121 may ask the crypto service 123 to digitally sign at least a part of the prepared notification using the private key maintained on the client computing device 110. The unique user identifier, the unique device identifier and the client username may be signed by the private key. The OS logon service extension 121 may send the signed notification to the API service 131 of the backend system 130 at step 202. The OS logon service extension 121 may receive an acknowledgement from the API service 131 at step 208. Although this disclosure describes sending a notification to a backend system upon a user's logon to a client computing device in a particular manner, this disclosure contemplates sending a notification to a client computing device upon a user's logon to a backend system in any suitable manner.

In particular embodiments, the computing system corresponding to the backend system 130 may receive a first notification indicating that a user has logged into a client computing device 110 associated with the user. The first notification may include a unique user identifier, a unique device identifier, and a client username. The unique user identifier may correspond to the user in the backend system 130. The unique device identifier may correspond to the client computing device 110. The client username may correspond to the user within an OS of the client computing device 110. At least a part of the first notification may be signed by the private key associated with the client computing device 110. As an example and not by way of limitation, continuing with a prior example, the API service 131 of the backend system 130 may receive a notification from the OS logon service extension 121 of the client computing device 110 at step 202. The notification may indicate that the user identified by the unique user identifier within the backend system 130 has logged on to the client computing device 110 identified by the unique device identifier using the client username, which is an identifier of the user within the OS of the client computing device 110. At least a part of the notification is signed by the private key maintained by the client computing device 110. Although this disclosure describes receiving a notification indicating that a user has logged on to a client computing device using a client username from the client computing device in a particular manner, this disclosure contemplates receiving a notification indicating that a user has logged on to a client computing device using a client username from the client computing device in any suitable manner.

In particular embodiments, the public key associated with the client computing device 110 may be pre-registered with the computing system corresponding to the backend system 130. The computing system may validate the first notification using the public key associated with the client computing device 110. As an example and not by way of limitation, continuing with a prior example, at step 204, the API service 131 of the backend system 130 may validate the digital signature associated with the notification received from the OS logon service extension 121 of the client computing device 110 using the pre-registered public key associated with the client computing device 110. Although this disclosure describes validating a digital signature associated with a notification received from a client computing device in a particular manner, this disclosure contemplates validating a digital signature associated with a notification received from a client computing device in any suitable manner.

In particular embodiments, the computing system corresponding to the backend system 130, upon a successful validation of the digital signature associated with the first notification, may determine whether a pairing record between a tuple of the client username and the unique device identifier and an SSO identifier associated with the user exists in a database associated with the computing system. As an example and not by way of limitation, continuing with a prior example, the API service 131 of the backend system 130 may publish the user's logon event reported in step 202 to the SSO event consumer service 133 of the backend system 130 at step 206. At step 210, the SSO event consumer service 133 may look up a pairing record between a tuple of the client username and the unique device identifier and an SSO identifier from the database 139 associated with the backend system 130. The tuple of the client username and the unique device identifier may be used as a key for the look-up. Although this disclosure describes determining whether a pairing record between a tuple of a client username and a unique device identifier and an SSO identifier associated with a user exists in a database associated with the backend system in a particular manner, this disclosure contemplates determining whether a pairing record between a tuple of a client username and a unique device identifier and an SSO identifier associated with a user exists in a database associated with the backend system in any suitable manner.

In particular embodiments, the computing system may create a temporary pairing record corresponding to a combination of the unique user identifier, the unique device identifier, and the client username into the database in response to a determination that the pairing record between a tuple of a client username and a unique device identifier and an SSO identifier does not exist. In particular embodiments, the temporary pairing record may expire at a pre-determined duration of time. As an example and not by way of limitation, continuing with a prior example, the SSO event consumer service 133 of the backend system 130 may receive a result of the look-up at step 212 indicating that the pairing record between a tuple of the client username and the unique device identifier and an SSO identifier does not exist in the database 139 associated with the backend system 130. Upon receiving the result at step 212, the SSO event consumer service 133 of the backend system 130, at step 214, may create a temporary pairing record corresponding to a combination of the unique user identifier, the unique device identifier, and the client username, which were provided in the first notification from the OS logon service extension 121 of the client computing device 110. At step 216, the SSO event consumer service 133 of the backend system 130 may receive a confirmation indicating that the temporary pairing record has successfully created from the database 139 associated with the backend system 130. In particular embodiments, the temporary pairing record may be configured to expire at a pre-determined amount of time. Although this disclosure describes creating a temporary pairing record corresponding to a combination of the unique user identifier, the unique device identifier, and the client username into the database when a pairing record between a tuple of a client username and a unique device identifier and an SSO identifier does not exist in a particular manner, this disclosure contemplates creating a temporary pairing record corresponding to a combination of the unique user identifier, the unique device identifier, and the client username into the database when a pairing record between a tuple of a client username and a unique device identifier and an SSO identifier does not exist in any suitable manner.

In particular embodiments, the user associated with the client computing device 110 may log in to an SSO-protected resource using a browser 115 on the client computing device 110. As an example and not by way of limitation, the browser 115 of the client computing device 110 may send an authentication request to the SSO service 137 at step 218 before the temporary pairing record corresponding to a combination of the unique user identifier, the unique device identifier, and the client username expires. While a number of message exchanges may occur between the browser 115 and the SSO service 137 in practice, the browser 115 may provide an SSO identifier corresponding to the user and an associated password at step 218. The browser 115 may request the agent 125 of the client computing device 110 to perform a status check with the backend system 130 at step 222. Upon receiving a request from the browser, the agent 125 may prepare a status notification. The status notification may include the unique user identifier, the unique device identifier, and the client username. The status notification may further include a type, a version, and a build number of the current operating system, device type, information associated with security posture, system integrity, network posture, or any other suitable information. The agent 125 may request the crypto service 123 to digitally sign the status notification. At step 224, the agent 125 may send the signed status notification to the endpoint status service 135 of the backend system 130. After the agent 125 receives an acknowledgement from the endpoint status service 135 at step 226, the agent 125 may send an acknowledgement to the browser 115 at step 230. Although this disclosure describes logging in to an SSO-protected resource and sending a digitally signed status notification to the backend system in a particular manner, this disclosure contemplates logging in to an SSO-protected resource and sending a digitally signed status notification to the backend system in any suitable manner.

In particular embodiments, the computing system corresponding to the backend system 130 may receive a request to log in to an SSO-protected resource. The request may include the SSO identifier. The computing system may receive a first signed status notification from the client computing device 110. The first signed status notification may include the unique user identifier, the unique device identifier, and the client username. As an example and not by way of limitation, continuing with a prior example, at step 218, the SSO service 137 of the backend system 130 may receive an authentication request before the temporary pairing record corresponding to a combination of the unique user identifier, the unique device identifier, and the client username expires. In particular embodiments, the authentication request may be redirected from a web application 150. The SSO service 137 may request the endpoint status service 135 to get a status notification from the client computing device 110 at step 220. The endpoint status service 135 may receive a digitally signed status notification from the agent 125 of the client computing device 110 at step 224. The endpoint status service 135 may send an acknowledgement to the agent 125 at step 226. At step 228, the endpoint status service 135 may forward the received signed status notification to the SSO service 137. Although this disclosure describes receiving an authentication request and acquiring a signed status notification from a client computing device in a particular manner, this disclosure contemplates receiving an authentication request and acquiring a signed status notification from a client computing device in any suitable manner.

In particular embodiments, the computing system corresponding to the backend system 130 may validate the first signed status notification using the public key. As an example and not by way of limitation, continuing with a prior example, at step 232, the SSO service 137 of the backend system 130 may send a request to the API service 131 of the backend system 130 to validate the digitally signed status notification received from the client computing device 110 at step 224. The API service 131 may validate the signature associated with the status notification using the public key associated with the client computing device 110. At step 234, the API service 131 may send a response indicating that the validation was successful. Although this disclosure describes validating a digital signature associated with a status notification from a client computing device using a public key associated with the client computing device in a particular manner, this disclosure contemplates validating a digital signature associated with a status notification from a client computing device using a public key associated with the client computing device in any suitable manner.

In particular embodiments, upon a successful validation of the first signed status notification, the computing system corresponding to the backend system 130 may determine whether the temporary pairing record corresponding to the combination of the unique user identifier, the unique device identifier, and the client username exists in the database 139. As an example and not by way of limitation, continuing with a prior example, at step 236, the SSO service 137 of the backend system 130 may look up a temporary pairing record corresponding to a combination of the unique user identifier, the unique device identifier, and the client username from the database 139 associated with the backend system 130. The SSO service 137 may use the unique user identifier, the unique device identifier, and the client username from the status notification as keys for the look-up. At step 238, the SSO service 137 may receive a result of the look-up indicating that the temporary pairing record corresponding to a combination of the unique user identifier, the unique device identifier, and the client username exists in the database 139. Thus, the SSO service 137 may determine that the temporary pairing record corresponding to a combination of the unique user identifier, the unique device identifier, and the client username exists. Although this disclosure describes determining whether a temporary pairing record corresponding to a combination of the unique user identifier, the unique device identifier, and the client username exists in a database in a particular manner, this disclosure contemplates determining whether a temporary pairing record corresponding to a combination of the unique user identifier, the unique device identifier, and the client username exists in a database in any suitable manner.

In particular embodiments, in response to the determination that the temporary pairing record exists, the computing system corresponding to the backend system 130 may create the pairing record between a tuple of a client username and a unique device identifier and the SSO identifier after the user successfully completes an SSO authentication, particular embodiments, the pairing record may include the unique device identifier such that the client username is paired with the SSO identifier only when the client username is used on the client computing device 110, which can be validated by a signed status notification from the client computing device 110. As an example and not by way of limitation, continuing with a prior example, after receiving a positive result of the look-up at step 238, the SSO service 137 may, at step 240, create a pairing record between a tuple of the client username and the unique device identifier and the SSO identifier, which was received at step 218. In particular embodiments, the pairing record may include the unique device identifier to make sure that the client username is paired with the SSO identifier only when the user logs on to the trusted client computing device identified by the unique device identifier using the client username. At step 242, the SSO service 137 may receive an acknowledgement from the database 139. Although this disclosure describes creating a pairing record between a tuple of a client username and a unique device identifier and an SSO identifier upon receiving an authentication request associated with the SSO identifier and determining that a temporary pairing record corresponding to a combination of a unique user identifier, a unique device identifier, and the client username exists in a particular manner, this disclosure contemplates creating a pairing record between a tuple of a client username and a unique device identifier and an SSO identifier upon receiving an authentication request associated with the SSO identifier and determining that a temporary pairing record corresponding to a combination of a unique user identifier, a unique device identifier, and the client username exists in any suitable manner.

Figure 3:
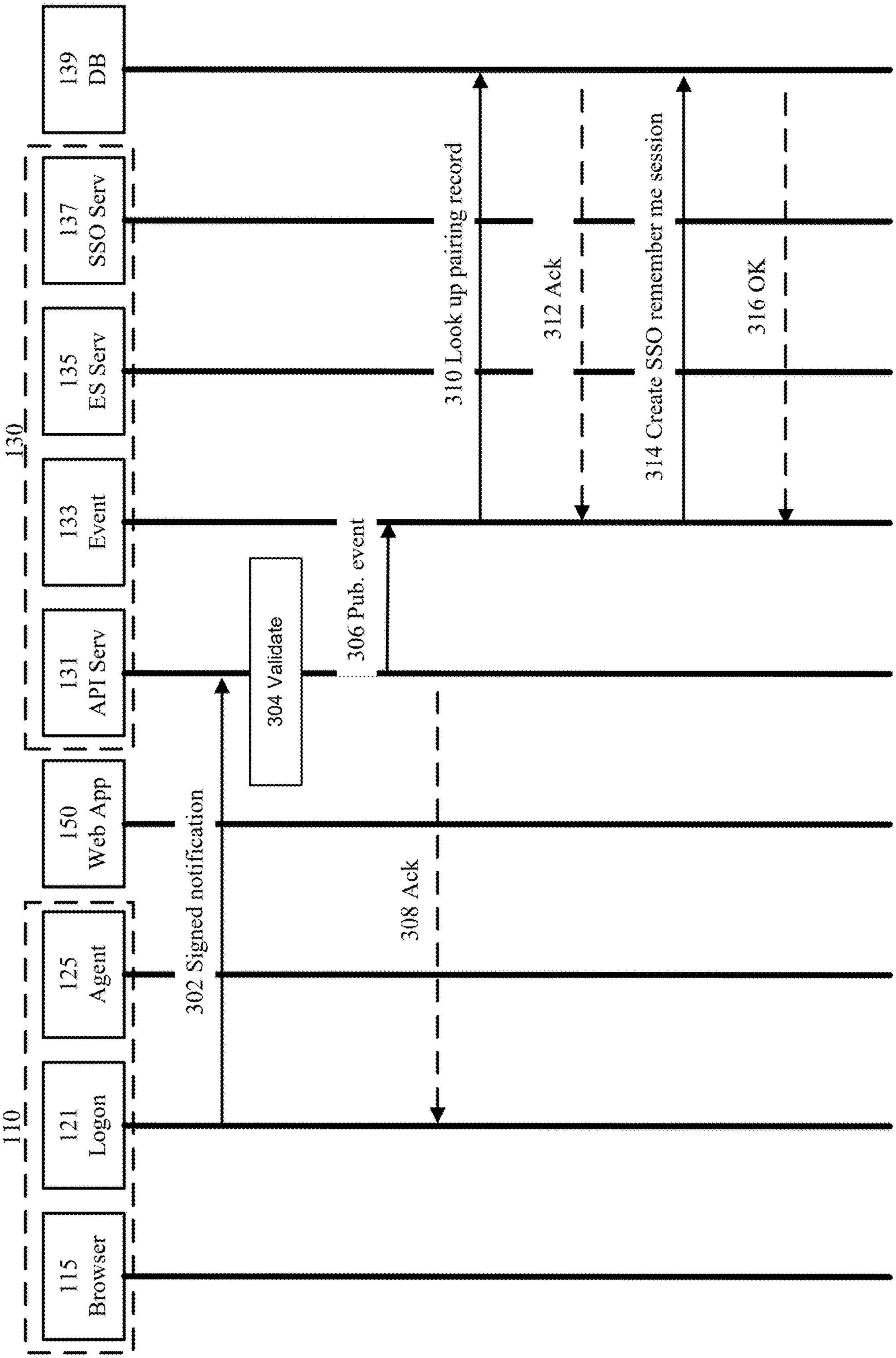
FIG. 3 illustrates an example message flow for creating an SSO remember me session associated with an SSO identifier paired with a client username.

FIG. 3 illustrates an example message flow for creating an SSO remember me session associated with an SSO identifier paired with a client username. In particular embodiments, a user associated with the client computing device 110 may log on to the client computing device 110 again using the client username. Upon detecting the logon event, the client computing device 110 may send a second notification to the computing system corresponding to the backend system 130. As an example and not by way of limitation, continuing with a prior example, the OS logon service extension 121 embedded on the client computing device 110 may detect the user's logon event and prepare a notification. The notification may include the unique user identifier corresponding to the user within the backend system 130, the unique device identifier corresponding to the client computing device 110, and the client username. The OS logon service extension 121 may ask the crypto service 123 to digitally sign at least a part of the prepared notification using the private key maintained on the client computing device 110. The unique user identifier, the unique device identifier and the client username may be signed by the private key. The OS logon service extension 121 may send the signed notification to the API service 131 of the backend system 130 at step 302. The OS logon service extension 121 may receive an acknowledgement from the API service 131 at step 308. Although this disclosure describes sending a second notification to the backend system upon a user's logon to the client computing device in a particular manner, this disclosure contemplates sending a second notification to the backend system upon a user's logon to the client computing device in any suitable manner.

In particular embodiments, the computing system corresponding to the backend system 130 may receive a second notification indicating that the user has logged into the client computing device 110. The second notification may include the unique user identifier, the unique device identifier, and the client username. At least a part of the second notification may be signed by the private key associated with the client computing device 110. As an example and not by way of limitation, continuing with a prior example, the API service 131 of the backend system 130 may receive a notification from the OS logon service extension 121 of the client computing device 110 at step 302. The notification may indicate that the user identified by the unique user identifier within the backend system 130 has logged on to the client computing device 110 identified by the unique device identifier using the client username. At least a part of the notification is signed by the private key maintained by the client computing device 110. Although this disclosure describes receiving a notification indicating that a user has logged on to a client computing device using a client username from the client computing device in a particular manner, this disclosure contemplates receiving a notification indicating that a user has logged on to a client computing device using a client username from the client computing device in any suitable manner.

In particular embodiments, the computing system corresponding to the backend system 130 may validate the second notification using the public key associated with the client computing device. As an example and not by way of limitation, continuing with a prior example, at step 304, the API service 131 of the backend system 130 may validate the digital signature associated with the notification received from the OS logon service extension 121 of the client computing device 110 using the public key associated with the client computing device 110. Although this disclosure describes validating a digital signature associated with a notification received from a client computing device in a particular manner, this disclosure contemplates validating a digital signature associated with a notification received from a client computing device in any suitable manner.

In particular embodiments, the computing system corresponding to the backend system 130, upon a successful validation of the digital signature associated with the second notification, may determine that the pairing record between a tuple of the client username and the unique device identifier and the SSO identifier exists in the database. As an example and not by way of limitation, continuing with a prior example, the API service 131 of the backend system 130 may publish the user's logon event reported in step 302 to the SSO event consumer service 133 of the backend system 130 at step 306. At step 310, the SSO event consumer service 133 may look up a pairing record between a tuple of a client username and a unique device identifier and an SSO identifier from the database 139 associated with the backend system 130. A tuple of the client username and the unique device identifier may be used as a key for the look-up. The SSO event consumer service 133 of the backend system 130 may receive a result of the look-up at step 312 indicating that the pairing record between the tuple of the client username and the unique device identifier and an SSO identifier exists in the database 139 associated with the backend system 130. Thus, the SSO event consumer service 133 may determine that the pairing record between the tuple of the client username and the unique device identifier and an SSO identifier exists in the database 139 associated with the backend system 130. Although this disclosure describes determining that a pairing record between a tuple of a client username and a unique device identifier and an SSO identifier associated with a user exists in a database associated with the backend system in a particular manner, this disclosure contemplates determining that a pairing record between a tuple of a client username and a unique device identifier and an SSO identifier associated with a user exists in a database associated with the backend system in any suitable manner.

In particular embodiments, the computing system corresponding to the backend system 130 may create an SSO remember me session for the SSO identifier accessed by the user corresponding to the client username on the client computing device upon determining that the pairing record between a tuple of the client username and the unique device identifier and the SSO identifier exists in the database. The SSO remember me session may expire when a session expiration condition is satisfied. In particular embodiments, the session expiration condition may include a timeout at a pre-determined amount of time. In particular embodiments, the session expiration condition may include an event where the user logs off the client computing device. As an example and not by way of limitation, continuing with a prior example, the SSO event consumer service 133 may create an SSO remember me session to the database 139 associated with the backend system 130 at step 314 upon receiving the positive result of the look-up at step 312. At step 316, the SSO event consumer service 133 may receive a confirmation from the database 139 associated with the backend system 130. In particular embodiments, the SSO remember me session may be looked up with the client username as a key. In particular embodiments, the SSO remember me session may be looked up with a combination of the client username and the unique device identifier as a key. In particular embodiments, the SSO remember me session may be looked up with a combination of the unique user identifier and the unique device identifier as a key. The SSO remember me session may indicate that the SSO-protected resources associated with the SSO identifier may be accessed by a user identified by the client username while the user is logged on to the client computing device 110 identified by the unique device identifier. In particular embodiments, the SSO remember me session may expire when the the client computing device 110 sends another notification indicating that the client username has logged off from the client computing device 110 identified by the unique device identifier. For example, the agent 125 may send a notification indicating that the client username has logged off from the client computing device 110 identified by the unique device identifier. In particular embodiments, the SSO remember me session may expire upon a timeout at a pre-configured time duration. Although this disclosure describes creating an SSO remember me session in a particular manner, this disclosure contemplates creating an SSO remember me session in any suitable manner.

Figure 4:
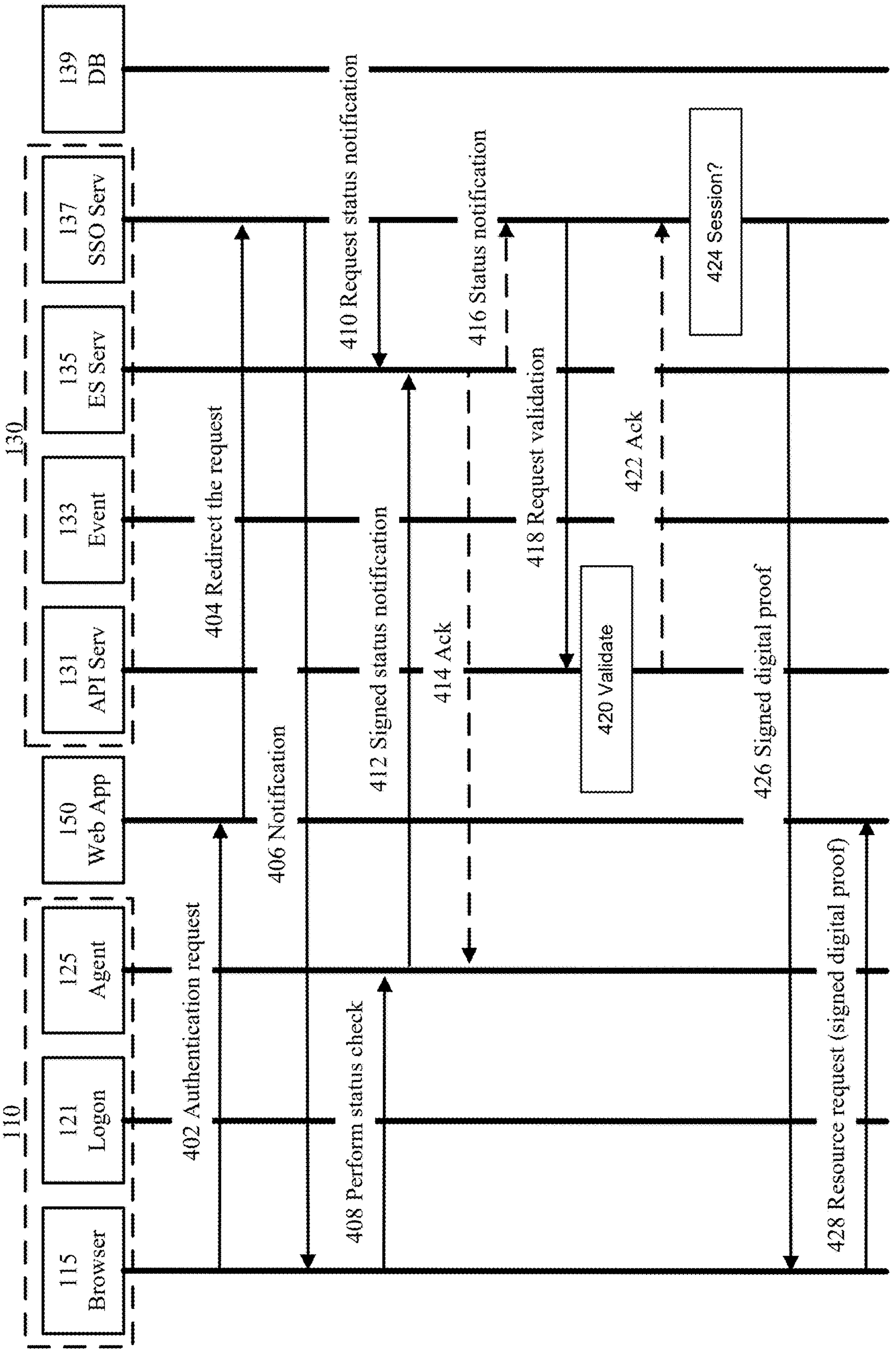
FIG. 4 illustrates an example message flow for an SSO authentication while an SSO remember me session is active.

While the SSO remember me session is active, the user logged on to the client device using the client username may access SSO-protected resources without providing further credentials. FIG. 4 illustrates an example message flow for an SSO authentication while an SSO remember me session is active. In particular embodiments, the user associated with the client computing device 110 may attempt to log in to a web application 150 using a browser 115 on the client computing device 110. As an example and not by way of limitation, continuing with a prior example, an SSO remember me session is active for the SSO identifier accessed by a user logged on to the client device using the client username. The browser 115 of the client computing device 110 may send an authentication request to the web application 150 at step 402. The authentication request may be redirected to the SSO service 137 of the backend system 130 at step 404. At step 406, the browser 115 may receive a notification from the SSO service of the backend system 130 indicating that a status notification is needed. The browser 115 may request the agent 125 of the client computing device 110 to perform a status check with the backend system 130 at step 408. Upon receiving a request from the browser, the agent 125 may prepare a status notification. The status notification may include the unique user identifier, the unique device identifier, and the client username. The status notification may further include a type, a version, and a build number of the current operating system, device type, information associated with security posture, system integrity, network posture, any information received from the SSO service at step 406, or any other suitable information. The agent 125 may request the crypto service 123 to digitally sign the status notification. At step 410, the agent 125 may send the signed status notification to the endpoint status service 135 of the backend system 130. After the agent 125 receives an acknowledgement from the endpoint status service 135 at step 412, the agent 125 may send an acknowledgement to the browser 115, though the acknowledgement to the browser is not shown in FIG. 4. Although this disclosure describes logging in to an SSO-protected resource and sending a digitally signed status notification to the backend system in a particular manner, this disclosure contemplates logging in to an SSO-protected resource and sending a digitally signed status notification to the backend system in any suitable manner.

In particular embodiments, the computing system corresponding to the backend system 130 may receive an SSO authentication request for an SSO-enabled application. In particular embodiments, the SSO authentication request may include the SSO identifier. In particular embodiments, the SSO-enabled application may be a web application. In particular embodiments, the SSO-enabled application may be an application running on a thick client. Upon receiving the SSO authentication request, the computing system may send a notification to the client computing device indicating that the second signed status notification is needed. As an example and not by way of limitation, continuing with a prior example, the SSO service 137 of the backend system 130 may receive an authentication request at step 404. The SSO service 137 may identify the SSO identifier associated with the authentication request. The SSO service 137 may send a notification to the browser 115 indicating that a status notification is needed at step 406. The notification may further include information to be included in the status notification as well as a transaction identifier. The information to be included in the status notification may include, but not limited to, the SSO identifier. Although this disclosure describes sending a notification to a client computing device indicating that a status notification is needed upon receiving an SSO authentication request in a particular manner, this disclosure contemplates sending a notification to a client computing device indicating that a status notification is needed upon receiving an SSO authentication request in any suitable manner.

In particular embodiments, the computing system corresponding to the backend system 130 may receive a second signed status notification from the client computing device 110. As an example and not by way of limitation, continuing with a prior example, at step 410, the SSO service 137 may request the endpoint status service 135 to get a status notification from the client computing device 110. In particular embodiments, the request may include a transaction identifier provided at step 406. The endpoint status service 135 may receive a digitally signed status notification from the agent 125 of the client computing device 110 at step 412. The endpoint status service 135 may send an acknowledgement to the agent 125 at step 414. At step 416, the endpoint status service 135 may forward the received signed status notification to the SSO service 137. Although this disclosure describes receiving a signed status notification from a client computing device in a particular manner, this disclosure contemplates receiving a signed status notification from a client computing device in any suitable manner.

In particular embodiments, the computing system corresponding to the backend system 130 may validate the second signed status notification using the public key associated with the client computing device 110. The second signed status notification may include the unique user identifier, the unique device identifier, and the client username. In particular embodiments, the second signed status notification may also include the SSO identifier. As an example and not by way of limitation, continuing with a prior example, at step 418, the SSO service 137 of the backend system 130 may send a request to the API service 131 of the backend system 130 to validate the digitally signed status notification received from the client computing device 110 at step 412. The API service 131 may validate the signature associated with the status notification using the public key associated with the client computing device 110 at step 420. At step 422, the API service 131 may send a response to the SSO service 137 indicating that the validation was successful. Although this disclosure describes validating a digital signature associated with a status notification from a client computing device using a public key associated with the client computing device in a particular manner, this disclosure contemplates validating a digital signature associated with a status notification from a client computing device using a public key associated with the client computing device in any suitable manner.

In particular embodiments, the computing system corresponding to the backend system 130 may determine that the SSO remember me session for the SSO identifier is active upon a successful validation of the second signed status notification. As an example and not by way of limitation, continuing with a prior example, the SSO service 137 may have the unique user identifier, the unique device identifier, the client username from the status notification received at step 412. In particular embodiments, the SSO service 137 may also have the SSO identifier from the status notification received at step 412. In particular embodiments, at step 424, the SSO service 137 may look up the SSO remember me session using the client username as a key from the database 139. In particular embodiments, the SSO service 137 may look up the SSO remember me session using a combination of the client username and the unique device identifier as a key from the database 139. In particular embodiments, the SSO service 137 may look up the SSO remember me session using a combination of the unique user identifier and the unique device identifier as a key from the database 139. The SSO service 137 may receive a result of the look-up indicating that the SSO remember me session is active from the database 139. The SSO remember me session may indicate that the SSO-protected resources associated with the SSO identifier may be accessed by a user identified by the client username while the user is logged on to the client computing device 110 identified by the unique device identifier. Although this disclosure describes determining that the SSO remember me session for the SSO identifier is active in a particular manner, this disclosure contemplates determining that the SSO remember me session for the SSO identifier is active in any suitable manner.

In particular embodiments, the computing system corresponding to the backend system 130 may send a signed digital proof of an authentication to the client computing device. The signed digital proof may allow the user to access digital resources from the SSO-enabled application. In particular embodiments, the signed digital proof of the authentication may be a signed browser cookie. In particular embodiments, the signed digital proof of the authentication may be a signed access token. As an example and not by way of limitation, continuing with a prior example, at step 426, the SSO service 137 of the backend system 130 may send a signed digital proof of the authentication to the browser 115 of the client device 110. In particular embodiments, the SSO service 137 may send the signed digital proof to the agent 125 of the client computing device 110. In such a case, the agent may forward the signed digital proof to the browser 115. Although this disclosure describes providing a signed digital proof of SSO authentication upon determining that an SSO remember me session is active in a particular manner, this disclosure contemplates providing a signed digital proof of SSO authentication upon determining that an SSO remember me session is active in any suitable manner.

In particular embodiments, the user logged on to the client computing device 110 may access SSO-protected resource from the SSO-enabled application using the signed digital proof. As an example and not by way of limitation, continuing with a prior example, the browser 115 on the client computing device 110 may request to access resources from the web application at step 428. The request may include the signed digital proof provided by the SSO service 137 at step 426. In particular embodiments, the signed digital proof may be a signed browser cookie. In particular embodiments, the signed digital proof may be a signed access token. The web application 150 may validate the signature associated with the digital proof using a public key associated with the backend system 130. Upon a successful validation, the web application 150 may allow the browser to access the resource on the web application without providing further credentials. Although FIG. 4 illustrates a web application as an example SSO-enabled application, this disclosure contemplates any suitable SSO-enabled application including native application deployed on a thick client, in such case the native application may perform functionalities of the web application 150 as well as the browser 115, Although this disclosure describes accessing SSO-protected resource using a signed digital proof without providing further credentials in a particular manner, this disclosure contemplates accessing SSO-protected resource using a signed digital proof without providing further credentials in any suitable manner.

Figure 5:
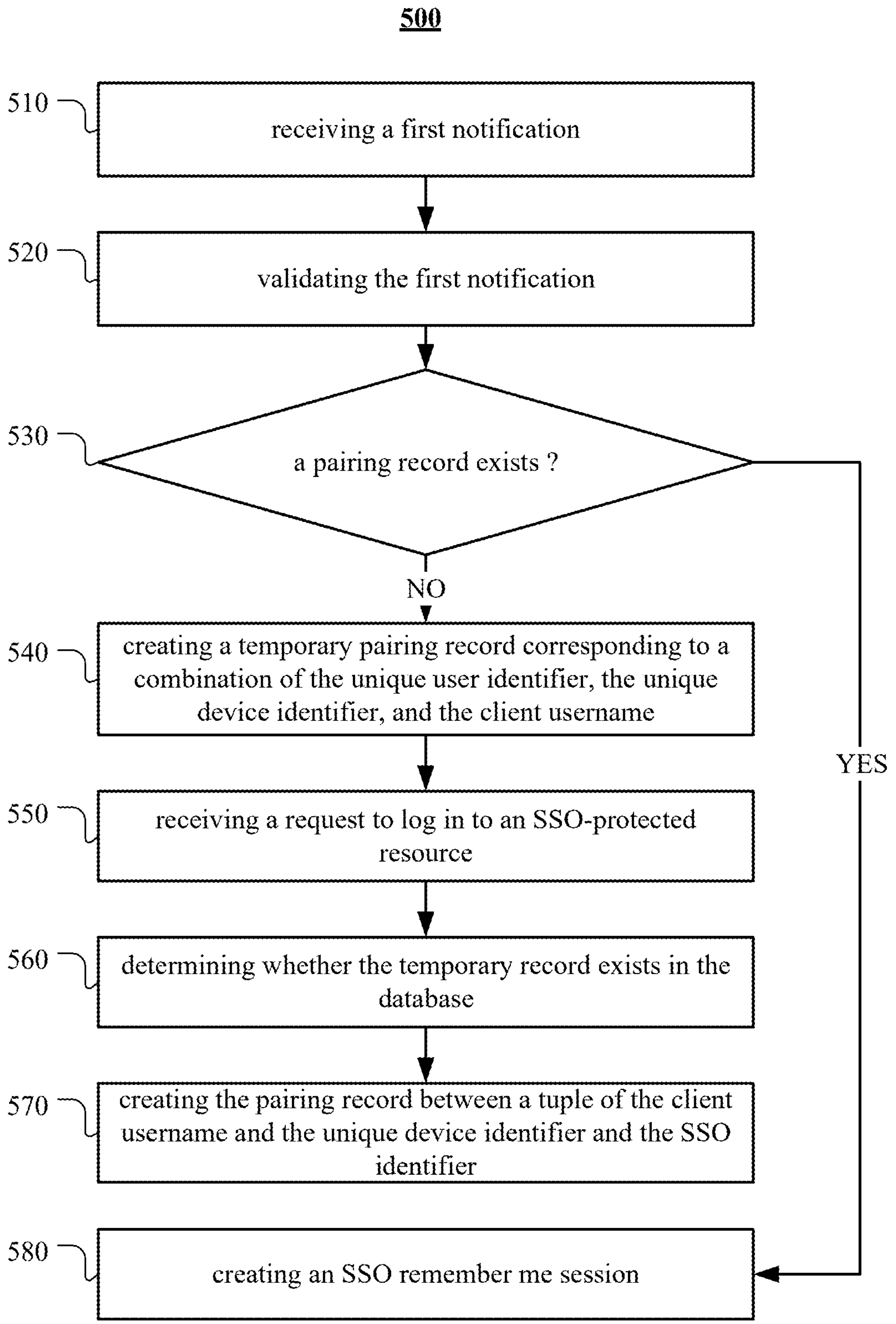
FIG. 5 illustrates an example method 500 for creating a pairing record between a tuple of a client username and a unique device identifier and an SSO identifier.

FIG. 5 illustrates an example method 500 for creating a pairing record between a tuple of a client username and a unique device identifier and an SSO identifier. The method may begin at step 510, where a computing system may receive a first notification indicating that a user has logged into a client computing device associated with the user. The first notification may comprise a unique user identifier, a unique device identifier, and a client username. A part of the first notification may be signed by a private key associated with the client computing device. At step 520, the computing system may validate the first notification using a public key associated with the client computing device. At step 530, the computing system may determine whether a pairing record between a tuple of the client username and the unique device identifier and an SSO identifier associated with the user exists in a database associated with the computing system. If the computing system determines that the pairing record between a tuple of the client username and the unique device identifier and an SSO identifier associated with the user does not exist in the database associated with the computing system, the method may proceed to step 540, where the computing system may create a temporary pairing record corresponding to a combination of the unique user identifier, the unique device identifier, and the client username into the database. If the computing system determines that the pairing record between a tuple of the client username and the unique device identifier and an SSO identifier associated with the user exists in the database associated with the computing system, the method may proceed to step 580, wherein the computing system may create an SSO remember me session for the SSO identifier accessed by the user corresponding to the client username on the client computing device. At step 550, the computing system may receive a request to log in to an SSO-protected resource. The request may comprise the SSO identifier. At step 560, the computing system may determine whether the temporary pairing record exists in the database. At step 570, the computing system may create the pairing record between a tuple of the client username and the unique device identifier and the SSO identifier in response to the determination that the temporary pairing record exists.

Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for creating a pairing record between a tuple of a client username and a unique device identifier and an SSO identifier of the method of FIG. 5, this disclosure contemplates any suitable method for creating a pairing record between a tuple of a client username and a unique device identifier and an SSO identifier including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
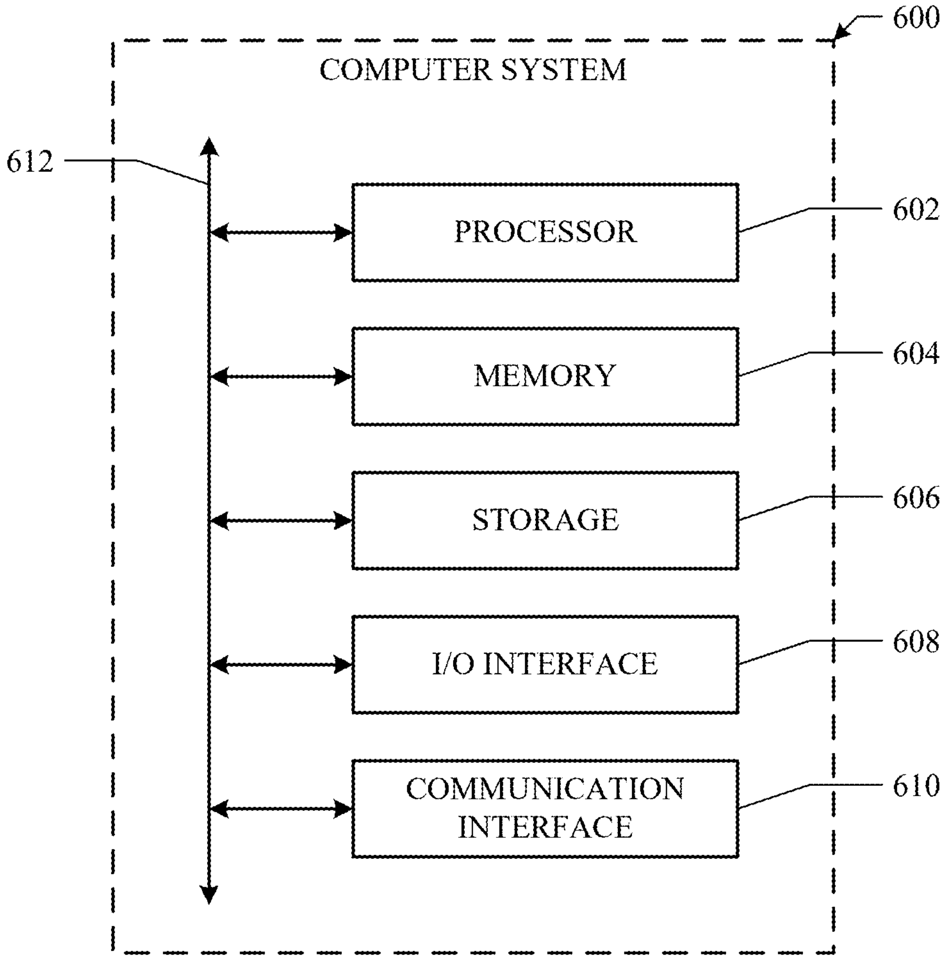
FIG. 6 illustrates an example computing system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, “or” is inclusive and not exclusive, unless expressly indicated otherwise or indicated otherwise by context. Therefore, herein, “A or B” means “A, B, or both,” unless expressly indicated otherwise or indicated otherwise by context. Moreover, “and” is both joint and several, unless expressly indicated otherwise or indicated otherwise by context. Therefore, herein, “A and B” means “A and B, jointly or severally,” unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:

receiving a first notification indicating that a user has logged into a client computing device associated with the user, the first notification comprising a unique user identifier, a unique device identifier, and a client username, wherein a part of the first notification is signed by a private key associated with the client computing device;

validating the first notification using a public key associated with the client computing device;

determining whether a pairing record between a tuple of the client username and the unique device identifier and a single sign-on (SSO) identifier associated with the user exists in a database associated with the computing system;

creating, in response to the determination that the pairing record does not exist, a temporary pairing record corresponding to a combination of the unique user identifier, the unique device identifier, and the client username into the database;

receiving a request to log in to an SSO-protected resource, the request comprising the SSO identifier;

determining whether the temporary pairing record exists in the database; and creating, in response to the determination that the temporary pairing record exists, the pairing record between the tuple of the client username and the unique device identifier and the SSO identifier.

2. The method of claim 1, wherein the unique user identifier corresponds to the user in the computing system, the unique device identifier corresponds to the client computing device, and the client username corresponds to the user within an operating system of the client computing device.

3. The method of claim 1, wherein the private key and the public key are hardware-backed, and wherein the private key is non-exportable on the client computing device.

4. The method of claim 1, wherein the public key is pre-registered with the computing system.

5. The method of claim 1, further comprising:

receiving, from the client computing device, a first signed status notification; and validating the first signed status notification using the public key, wherein determining whether the temporary pairing record exists in the database is performed upon a successful validation of the first signed status notification.

6. The method of claim 1, wherein the temporary pairing record expires at a pre-determined duration of time.

7. The method of claim 1, further comprising:

receiving a second notification indicating that the user has logged into the client computing device, the second notification comprising the unique user identifier, the unique device identifier, and the client username, wherein a part of the second notification is signed by the private key;

validating the second notification using the public key;

determining that the pairing record between the tuple of the client username and the unique device identifier and the SSO identifier exists in the database; and creating an SSO remember me session for the SSO identifier accessed by the user corresponding to the client username on the client computing device.

8. The method of claim 7, wherein the SSO remember me session expires when a session expiration condition is satisfied.

9. The method of claim 8, wherein the session expiration condition comprises a timeout at a pre-determined amount of time.

10. The method of claim 8, wherein the session expiration condition comprises an event where the user logs off the client computing device.

11. The method of claim 7, further comprising:

receiving an SSO authentication request for an SSO-enabled application, the SSO authentication request comprises the SSO identifier;

receiving a second signed status notification from the client computing device;

validating the second signed status notification using the public key;

determining, upon a successful validation of the second signed status notification, that the SSO remember me session for the SSO identifier is active; and sending, to the client computing device, a signed digital proof of an authentication, wherein the signed digital proof allows the user to access digital resources from the SSO-enabled application.

12. The method of claim 11, wherein the signed digital proof of the authentication is a signed browser cookie.

13. The method of claim 11, wherein the signed digital proof of the authentication is a signed access token.

14. The method of claim 11, further comprising:

sending, upon receiving the SSO authentication request, to the client computing device, a notification indicating that the second signed status notification is needed.

15. The method of claim 11, wherein the SSO-enabled application is a web application.

16. The method of claim 11, wherein the SSO-enabled application is an application running on a thick client.

17. A computing system comprising:
one or more processors; and
one or more computer-readable non-transitory storage media coupled to one or more of the processors and comprising instructions operable when executed by one or more of the processors to:
receive a first notification indicating that a user has logged into a client computing device associated with the user, the first notification comprising a unique user identifier, a unique device identifier, and a client username, wherein a part of the first notification is signed by a private key associated with the client computing device;
validate the first notification using a public key associated with the client computing device;
determine whether a pairing record between a tuple of the client username and the unique device identifier and a single sign-on (SSO) identifier associated with the user exists in a database associated with the computing system;
create, in response to the determination that the pairing record does not exist, a temporary pairing record corresponding to a combination of the unique user identifier, the unique device identifier, and the client username into the database;
receive a request to log in to an SSO-protected resource, the request comprising the SSO identifier;
determine whether the temporary pairing record exists in the database; and
create, in response to the determination that the temporary pairing record exists, the pairing record between the tuple of the client username and the unique device identifier and the SSO identifier.

18. The computing system of claim 17, wherein the one or more processors are further operable when executing the instructions to:
receive a second notification indicating that the user has logged into the client computing device, the second notification comprising the unique user identifier, the unique device identifier, and the client username, wherein a part of the second notification is signed by the private key;
validate the second notification using the public key;
determine that the pairing record between the tuple of the client username and the unique device identifier and the SSO identifier exists in the database; and
create an SSO remember me session for the SSO identifier accessed by the user corresponding to the client username on the client computing device.

19. One or more computer-readable non-transitory storage media embodying software that is operable when executed by a computing system to:
receive a first notification indicating that a user has logged into a client computing device associated with the user, the first notification comprising a unique user identifier, a unique device identifier, and a client username, wherein a part of the first notification is signed by a private key associated with the client computing device;
validate the first notification using a public key associated with the client computing device;
determine whether a pairing record between a tuple of the client username and the unique device identifier and a single sign-on (SSO) identifier associated with the user exists in a database associated with the computing system;
create, in response to the determination that the pairing record does not exist, a temporary pairing record corresponding to a combination of the unique user identifier, the unique device identifier, and the client username into the database;
receive a request to log in to an SSO-protected resource, the request comprising the SSO identifier;
determine whether the temporary pairing record exists in the database; and
create, in response to the determination that the temporary pairing record exists, the pairing record between the tuple of the client username and the unique device identifier and the SSO identifier.

20. The media of claim 19, wherein the software is further operable when executed to:
receive a second notification indicating that the user has logged into the client computing device, the second notification comprising the unique user identifier, the unique device identifier, and the client username, wherein a part of the second notification is signed by the private key;
validate the second notification using the public key;
determine that the pairing record between the tuple of the client username and the unique device identifier and the SSO identifier exists in the database; and
create an SSO remember me session for the SSO identifier accessed by the user corresponding to the client username on the client computing device.

* * * * *